United States Patent
Xu et al.

(10) Patent No.: US 11,343,688 B2
(45) Date of Patent: *May 24, 2022

(54) CONTROL CHANNEL BASED BROADCAST MESSAGING

(71) Applicant: QUALCOMM Incorporated, San Diego, CA (US)

(72) Inventors: Hao Xu, Beijing (CN); Wanshi Chen, San Diego, CA (US); Madhavan Srinivasan Vajapeyam, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,814

(22) Filed: Apr. 14, 2020

(65) Prior Publication Data
US 2020/0245171 A1    Jul. 30, 2020

Related U.S. Application Data

(63) Continuation of application No. 15/132,729, filed on Apr. 19, 2016, now Pat. No. 10,652,768.
(Continued)

(51) Int. Cl.
*H04W 4/70* (2018.01)
*H04W 24/08* (2009.01)
(Continued)

(52) U.S. Cl.
CPC ............. *H04W 24/08* (2013.01); *H04W 4/70* (2018.02); *H04W 72/042* (2013.01); *H04W 4/06* (2013.01); *H04W 48/08* (2013.01); *H04W 74/006* (2013.01)

(58) Field of Classification Search
CPC ....... H04W 4/005; H04W 4/06; H04W 24/08; H04W 28/02; H04W 48/08; H04W 48/10;
(Continued)

(56) References Cited

U.S. PATENT DOCUMENTS

| 7,826,859 B2 | 11/2010 | Lee et al. |
| 8,213,377 B2 | 7/2012 | Lee et al. |

(Continued)

FOREIGN PATENT DOCUMENTS

| CN | 103999528 A | 8/2014 |
| CN | 104081851 A | 10/2014 |

(Continued)

OTHER PUBLICATIONS

3GPP TS 36.211: "3rd Generation Partnership Project Technical Specification Group Radio Access Network, Evolved Universal Terrestrial Radio Access (E-UTRA), Physical Channels and Modulation (Release 12)", 3rd Generation Partnership Project (3GPP), Mobile Competence Centre, 650, Route Des Lucioles, F-06921 Sophia-Antipolis Cedex, France, vol. RAN WG1, No. V12.5.0, Mar. 16, 2015 (Mar. 16, 2015), pp. 1-136, XP050928082, [retrieved on Mar. 16, 2015] p. 11-p. 14.

(Continued)

*Primary Examiner* — Alpus Hsu
(74) *Attorney, Agent, or Firm* — Qualcomm Incorporated

(57) ABSTRACT

Aspects of the present disclosure provided techniques that may be applied in systems to allow for communication over a control channel utilizing a relatively narrowband (e.g., six physical resource blocks) based search space. An exemplary method, performed, for example, by a machine type communication (MTC) UE, generally includes identifying, within a subframe, a first search space to monitor for a control channel that occupies a first number of physical resource blocks (PRBs) that represents a narrowband within
(Continued)

a system bandwidth comprising a plurality of narrowbands and monitoring at least the first search space for the control channel, wherein the control channel comprises broadcast control information.

49 Claims, 8 Drawing Sheets

Related U.S. Application Data

(60) Provisional application No. 62/150,247, filed on Apr. 20, 2015.

(51) Int. Cl.
  *H04W 72/04* (2009.01)
  *H04W 4/06* (2009.01)
  *H04W 48/08* (2009.01)
  *H04W 74/00* (2009.01)

(58) Field of Classification Search
  CPC . H04W 72/005; H04W 72/04; H04W 72/044; H04W 72/0453; H04W 72/1278; H04W 74/002; H04W 74/006
  See application file for complete search history.

(56) References Cited

U.S. PATENT DOCUMENTS

| | | |
|---|---|---|
| 8,520,620 B2 | 8/2013 | Ji et al. |
| 8,717,904 B2 | 5/2014 | Lee et al. |
| 8,913,576 B2 | 12/2014 | Shan et al. |
| 8,917,679 B2 | 12/2014 | Lindh et al. |
| 8,971,881 B2 | 3/2015 | Nimbalker et al. |
| 8,995,366 B2 | 3/2015 | Nimbalker et al. |
| 9,019,922 B2 | 4/2015 | Oizumi et al. |
| 9,031,025 B2 | 5/2015 | Nakao et al. |
| 9,055,578 B2 | 6/2015 | Sartori et al. |
| 9,071,981 B2 | 6/2015 | Wu |
| 9,088,932 B2 | 7/2015 | Lee et al. |
| 9,107,162 B2 | 8/2015 | Zhu et al. |
| 9,155,093 B2 | 10/2015 | Oizumi et al. |
| 9,191,943 B2 | 11/2015 | Park et al. |
| 9,198,181 B2 | 11/2015 | Blankenship et al. |
| 9,232,437 B2 | 1/2016 | Khoryaev et al. |
| 9,241,287 B2 | 1/2016 | Montojo et al. |
| 9,369,248 B2 | 6/2016 | Cheng et al. |
| 9,380,567 B2 | 6/2016 | Chen et al. |
| 9,386,487 B2 | 7/2016 | Zhu et al. |
| 9,398,572 B2 | 7/2016 | Zhu et al. |
| 9,420,609 B2 | 8/2016 | Abe et al. |
| 9,468,037 B2 | 10/2016 | Cheng et al. |
| 9,497,736 B2 | 11/2016 | Horiuchi et al. |
| 9,503,239 B2 | 11/2016 | Larsson et al. |
| 9,509,470 B2 | 11/2016 | Janis et al. |
| 9,521,653 B2 | 12/2016 | Zhu et al. |
| 9,544,876 B2 | 1/2017 | Chen et al. |
| 9,548,845 B2 | 1/2017 | Yi et al. |
| 9,571,241 B2 | 2/2017 | Baker et al. |
| 9,585,009 B2 | 2/2017 | Ta et al. |
| 9,603,081 B2 | 3/2017 | Seo et al. |
| 9,615,351 B2 | 4/2017 | Zhu et al. |
| 9,622,230 B2* | 4/2017 | Chen .............. H04L 5/001 |
| 9,655,110 B2 | 5/2017 | Wong et al. |
| 9,686,633 B2 | 6/2017 | Jamadagni et al. |
| 9,713,133 B2 | 7/2017 | Kim et al. |
| 9,735,942 B2* | 8/2017 | Xu ................ H04W 72/04 |
| 9,763,240 B2 | 9/2017 | Takeda et al. |
| 9,769,818 B2 | 9/2017 | Golitschek et al. |
| 9,900,875 B2 | 2/2018 | Xu et al. |
| 9,924,505 B2 | 3/2018 | Moulsley |
| 10,028,263 B2 | 7/2018 | Wu et al. |
| 10,038,529 B2 | 7/2018 | Wang et al. |
| 10,165,423 B2* | 12/2018 | Rico Alvarino ...... H04W 4/06 |
| 10,321,456 B2 | 6/2019 | Koulakiotis et al. |
| 10,609,756 B2* | 3/2020 | Takeda ............... H04W 76/27 |
| 10,652,768 B2 | 5/2020 | Xu et al. |
| 2012/0106465 A1 | 5/2012 | Haghighat et al. |
| 2013/0015068 A1 | 1/2013 | Chen et al. |
| 2013/0039284 A1 | 2/2013 | Marinier et al. |
| 2013/0083753 A1 | 4/2013 | Lee et al. |
| 2013/0250880 A1 | 9/2013 | Liao et al. |
| 2013/0294361 A1 | 11/2013 | Chen et al. |
| 2013/0294362 A1 | 11/2013 | Xu et al. |
| 2013/0301562 A1 | 11/2013 | Liao et al. |
| 2014/0036804 A1 | 2/2014 | Chen et al. |
| 2014/0198726 A1 | 7/2014 | Xu et al. |
| 2015/0110031 A1 | 4/2015 | Takeda et al. |
| 2015/0181573 A1 | 6/2015 | Takeda et al. |
| 2015/0264667 A1 | 9/2015 | Lee et al. |
| 2015/0282129 A1 | 10/2015 | Takeda et al. |
| 2015/0295689 A1 | 10/2015 | Lee et al. |
| 2016/0112997 A1* | 4/2016 | Chen .................. H04L 5/0087 370/329 |
| 2016/0242207 A1 | 8/2016 | Yasukawa et al. |
| 2016/0302174 A1 | 10/2016 | Chatterjee et al. |
| 2016/0316465 A1 | 10/2016 | Sahlin et al. |
| 2017/0223725 A1 | 8/2017 | Xiong et al. |
| 2017/0273059 A1* | 9/2017 | You .................... H04L 5/0094 |

FOREIGN PATENT DOCUMENTS

| | | |
|---|---|---|
| RU | 2505945 C1 | 1/2014 |
| WO | 2013049768 A1 | 4/2013 |

OTHER PUBLICATIONS

3GPP TS 36.331: "3rd Generation Partnership Project; Technical Specification Group Radio Access Network; Evolved Universal Terrestrial Radio Access (E-UTRA); Radio Resource Control (RRC); Protocol Specification (Release 12)", 3GPP Standard, 3rd Generation Partnership Project (3GPP), Mobile Competence Centre; 650, Route Des Lucioles; F-06921 Sophia-Antipolis Cedex; France, vol. RAN WG2, No. V12.5.0, Mar. 27, 2015, pp. 1-445, Chapters 5.2.1.2, 5.2.1.3, 5.3.2.3, 6.2.2 and 6.3.2.
Ericsson: "Common Control Messages for MTC [online]", 3GPP TSG-RAN WG1#78b R1-143789, Sep. 27, 2014, 6 pages, URL:http://www.3gpp.org/ftp/tsg_ran/WG1_RL1/TSGR1_78b/Docs/R1-143789.zip.
Huawei et al., "Consideration on RACH Procedure in Coverage Enhancement [online]", 3GPP TSG-RAN WG2#90 R2-152232, May 15, 2015, URL:http://www.3gpp.org/ftp/tsg_ran/WG2_RL2/TSGR2_90/Docs/R2-152232.zip, 4 pages.
International Search Report and Written Opinion—PCT/US2016/028404—ISA/EPO—dated Jun. 24, 2016.
Nokia Networks: "Resource Block Allocation for MTC [online]", 3GPP TSG-RAN WG1#80b R1-151306, Apr. 10, 2015, 3 pages, URL:http:/www.3gpp.org/ftp/tsg_ran/WG1_RL1/TSGR1_80b/Docs/R1-151306.zip.
Qualcomm Incorporated: "Considerations on paging for Rel.13 eMTC [online]", 3GPP TSG-RAN WG2#89bis, R2-151296, Apr. 11, 2015, 4 pages, URL:http://www.3gpp.org/ftp/tsg_ran/WG2_RL2/TSGR2_89bis/Docs/R2-151296.zip.
Qualcomm Incorporated: "Physical Data Channels and Associated Physical Control Channels", 3GPP draft, R1-145079 Physical Data Channels and Associated Physical Control Channels, 3rd Generation Partnership Project (3GPP), Mobile Competence Centre, 650, Route Des Lucioles, F-06921 Sophia-An, vol. RAN WG1, Nov. 17, 2014 (Nov. 17, 2014), 4 Pages, XP050876113, Retrieved from the Internet: URL: http://www.3gpp.org/ftp/Meetings_3GPP_SYNC/RAN1/Docs/ [retrieved on Nov. 17, 2014] the whole document.
Samsung: "SIBs for Rel-13 MTC [online]", 3GPP TSG-RAN WG2#89bis R2-151085, Apr. 10, 2015, 4 pages, URL: http://www.3gpp.org/ftp/tsg_ran/WG2_RL2/TSGR2_89bis/Docs/R2-151085.zip.
Taiwan Search Report—TW105112324—TIPO—dated Feb. 11, 2020.

(56) References Cited

OTHER PUBLICATIONS

Wang M., et al., "The Evolution of LTE Physical Layer Control Channels", IEEE Communications Surveys & Tutorials, vol. 18, No. 2, May 20, 2016 (May 20, 2016), pp. 1336-1354, XP011611163, DOI: 10.1109/COMST.2015.2510371 [retrieved on May 20, 2016] the whole document.
ETSI TS 136 211: "LTE; Evolved Universal Terrestrial Radio Access E-UTRA; Physical Channels and Modulation (3GPP TS 36.211 Version 12.5.0 Release 12)", ETSI TS 136 211 V12.5.0 (Apr. 2015), Section 6 (https://portal.3gpp.org/desktopmodules/Specifications/SpecificationDetails.aspx?specificationId=2425), 139 Pages.
European Search Report—EP21157839—Search Authority—Munich—dated Jun. 2, 2021.
Taiwan Search Report—TW110108263—TIPO—dated Mar. 8, 2022.

\* cited by examiner

CONTROL CHANNEL BASED BROADCAST MESSAGING

CLAIM OF PRIORITY UNDER 35 U.S.C. § 120

This application is a continuation of U.S. Non-Provisional patent application Ser. No. 15/132,729, filed Apr. 19, 2016, which claims benefit of and priority to U.S. Provisional Patent Application Ser. No. 62/150,247, filed Apr. 20, 2015, both of which are assigned to the assignee hereof and hereby expressly incorporated by reference herein in their entireties as if fully set forth below and for all applicable purposes.

FIELD

Certain aspects of the present disclosure generally relate to wireless communications and, more particularly, to control channel based broadcast messaging.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE)/LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Some examples of UEs may include cellular phones, smart phones, personal digital assistants (PDAs), wireless modems, handheld devices, tablets, laptop computers, netbooks, smartbooks, ultrabooks, robots, drones, wearable devices (e.g., smart watch, smart bracelet, smart ring, smart clothing, smart glasses), etc. Some UEs may be considered machine-type communication (MTC) UEs, which may include remote devices, such as sensors, meters, location tags, monitoring devices, etc., that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

To enhance coverage of certain devices, such as MTC devices, "bundling" may be utilized in which certain transmissions are sent as a bundle of transmissions, for example, with the same information transmitted over multiple subframes.

SUMMARY

Certain aspects of the present disclosure provide techniques and apparatus for communicating control channels to certain devices, such as machine type communication (MTC) UEs.

Certain aspects of the present disclosure provide a method for wireless communications by a user equipment (UE). The method generally includes identifying, within a subframe, a first search space to monitor for a control channel that occupies a first number of physical resource blocks (PRBs) that represents a narrowband within a system bandwidth comprising a plurality of narrowbands and monitoring at least the first search space for broadcast control information, wherein the control channel comprises broadcast control information.

Certain aspects of the present disclosure provide an apparatus for wireless communications by a user equipment (UE). The apparatus generally includes at least one processor configured to identify, within a subframe, a first search space to monitor for a control channel that occupies a first number of physical resource blocks (PRBs) that represents a narrowband within a system bandwidth comprising a plurality of narrowbands and monitor at least the first search space for the control channel, wherein the control channel comprises broadcast control information. The apparatus also includes a memory coupled with the at least one processor.

Certain aspects of the present disclosure provide an apparatus for wireless communications by a user equipment (UE). The apparatus generally includes means for identifying, within a subframe, a first search space to monitor for a control channel that occupies a first number of physical resource blocks (PRBs) that represents a narrowband within a system bandwidth comprising a plurality of narrowbands and means for monitoring at least the first search space for the control channel, wherein the control channel comprises broadcast control information.

Certain aspects of the present disclosure provide non-transitory computer readable medium for wireless communications by a user equipment (UE). The non-transitory computer readable medium generally includes code to identify, within a subframe, a first search space to monitor for a control channel that occupies a first number of physical resource blocks (PRBs) that represents a narrowband within a system bandwidth comprising a plurality of narrowbands and code to monitor at least the first search space for the control channel, wherein the control channel comprises broadcast control information.

Certain aspects of the present disclosure provide a method for wireless communications by a base station (BS). The method generally includes identifying, within a subframe, a first search space for transmitting a control channel that occupies a first number of physical resource blocks (PRBs) that represents a narrowband within a system bandwidth comprising a plurality of narrowbands and transmitting the control channel, to a user equipment (UE), using a decoding candidate in the first search space, wherein the control channel comprises broadcast control information.

Certain aspects of the present disclosure provide an apparatus for wireless communications by a base station (BS). The apparatus generally includes at least one processor configured to identify, within a subframe, a first search space for transmitting a control channel that occupies a first number of physical resource blocks (PRBs) that represents a narrowband within a system bandwidth comprising a plurality of narrowbands and a transmitter configured to transmit the control channel, to a user equipment (UE), using a decoding candidate in the first search space, wherein the control channel comprises broadcast control information. The apparatus also generally includes a memory coupled with the at least one processor.

Certain aspects of the present disclosure provide an apparatus for wireless communications by a base station (BS). The apparatus generally includes means for identifying, within a subframe, a first search space for transmitting a control channel that occupies a first number of physical resource blocks (PRBs) that represents a narrowband within a system bandwidth comprising a plurality of narrowbands and means for transmitting the control channel, to a user equipment (UE), using a decoding candidate in the first search space, wherein the control channel comprises broadcast control information.

Certain aspects of the present disclosure provide non-transitory computer readable medium for wireless communications by a base station (BS). The non-transitory computer readable medium generally includes code to identify, within a subframe, a first search space for transmitting a control channel that occupies a first number of physical resource blocks (PRBs) that represents a narrowband within a system bandwidth comprising a plurality of narrowbands and code to transmit the control channel, to a user equipment (UE), using a decoding candidate in the first search space, wherein the control channel comprises broadcast control information.

Numerous other aspects are provided including methods, apparatus, systems, computer program products, and processing systems.

DETAILED DESCRIPTION

Aspects of the present disclosure provide techniques that may help enable efficient communication between a base station and machine type communication (MTC) based user equipments (UEs). For example, the techniques may provide a design for a control channel targeting MTC UEs, using a narrowband (e.g., a six-PRB) based search space for communication.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-Advanced, and LTE/LTE-Advanced terminology is used in much of the description below. LTE and LTE-A are referred to generally as LTE.

Figure 1:
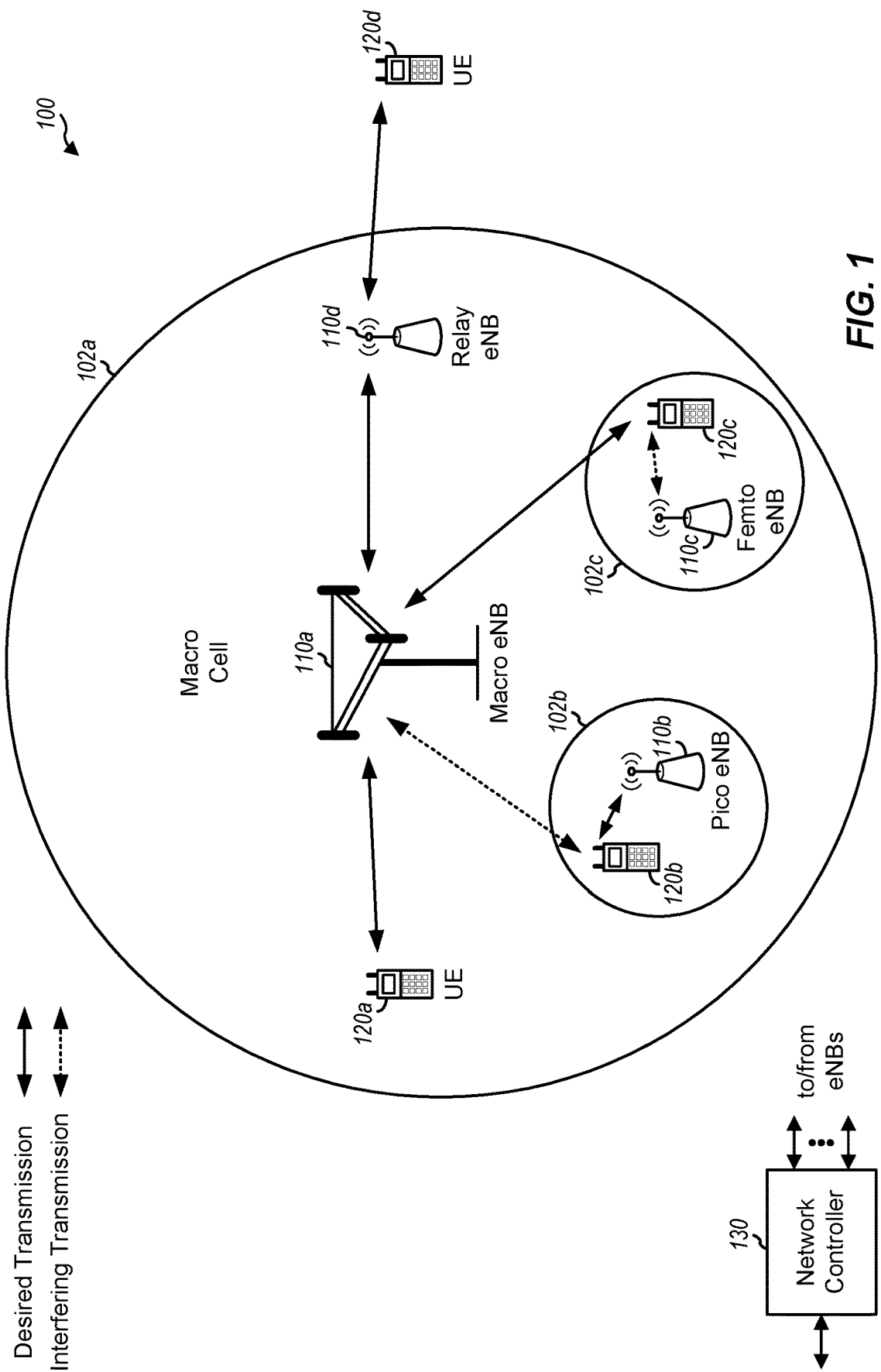
FIG. 1 is a block diagram conceptually illustrating an example of a wireless communication network, in accordance with certain aspects of the present disclosure.

FIG. 1 illustrates an example wireless communication network 100, in which aspects of the present disclosure may be practiced. For example, techniques presented herein may be used to help UEs and BSs shown in FIG. 1 communicate on a machine type physical downlink control channel (mPDCCH) using a narrowband (e.g., six-PRB) based search space.

The network 100 may be an LTE network or some other wireless network. Wireless network 100 may include a number of evolved Node Bs (eNBs) 110 and other network entities. An eNB is an entity that communicates with user equipments (UEs) and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station" and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

Figure 2:
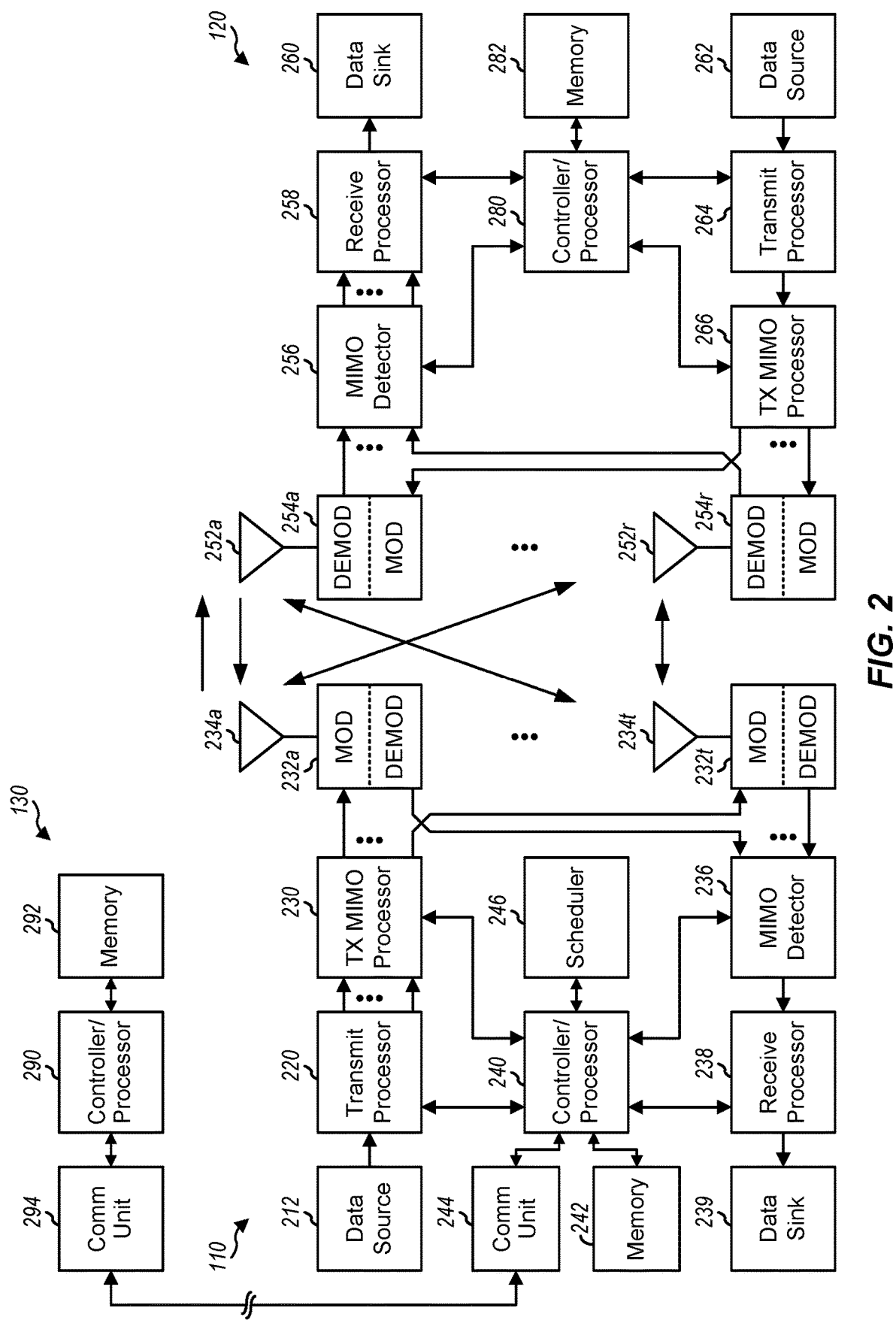
FIG. 2 shows a block diagram conceptually illustrating an example of a base station in communication with a user equipment (UE) in a wireless communications network, in accordance with certain aspects of the present disclosure.

FIG. 2 shows a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based on CQIs received from the UE, process (e.g., encode and modulate) the data for each UE based on the MCS(s) selected for the UE, and provide data symbols for all UEs. Transmit processor 220 may also process system information (e.g., for SRPI, etc.) and control information (e.g., CQI requests, grants, upper layer signaling, etc.) and provide overhead symbols and control symbols. Processor 220 may also generate reference symbols for reference signals (e.g., the CRS) and synchronization signals (e.g., the PSS and SSS). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. For example, processor 240 and/or other processors and modules at base station 110 may perform direct operations 800 shown in FIG. 8. Similarly, processor 280 and/or other processors and modules at UE 120, may perform or direct operations 700 shown in FIG. 7. Memories 242 and 282 may store data and program codes for base station 110 and UE 120, respectively. A scheduler 246 may schedule UEs for data transmission on the downlink and/or uplink.

Figure 3:
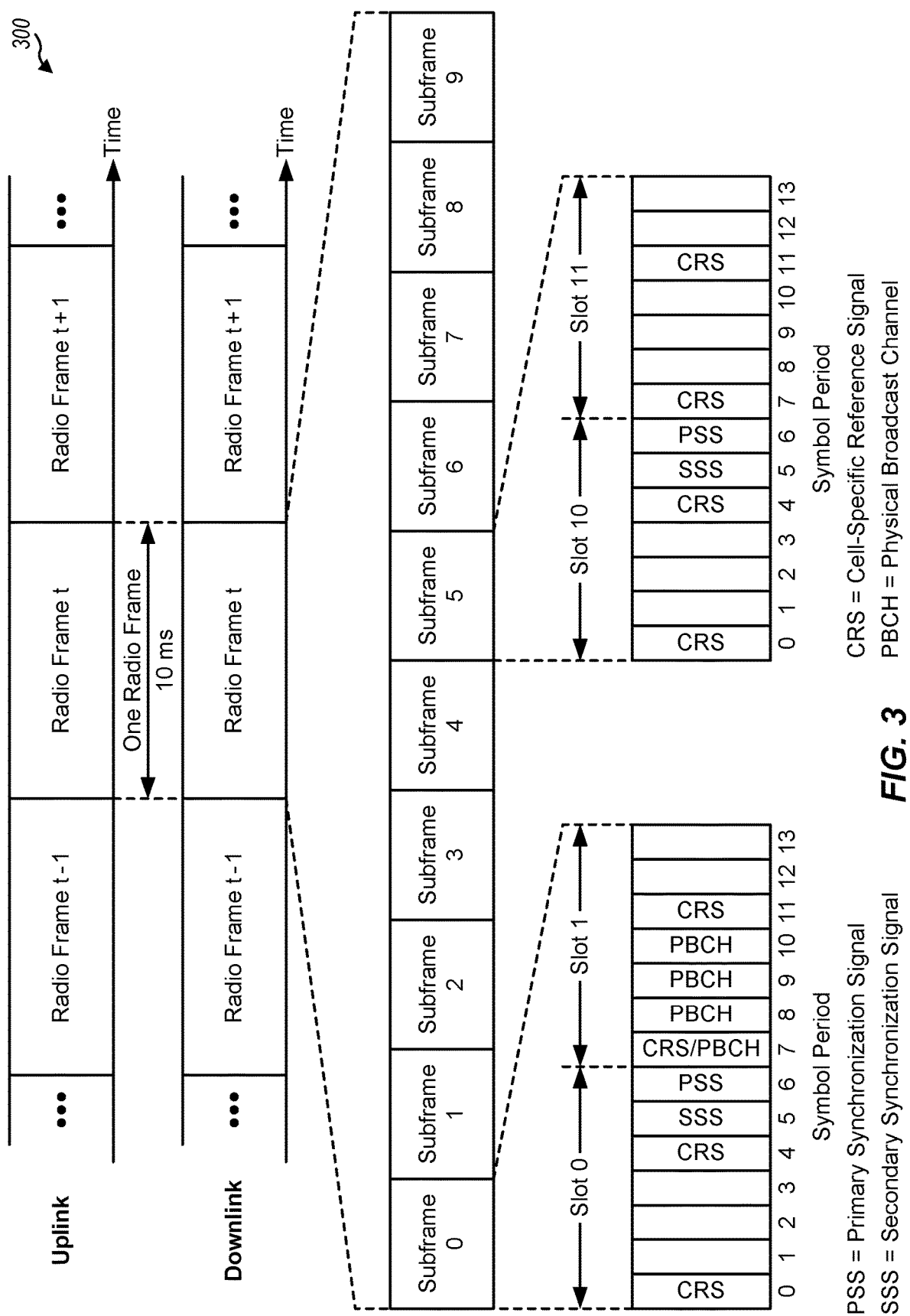
FIG. 3 is a block diagram conceptually illustrating an example of a frame structure in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

Figure 4:
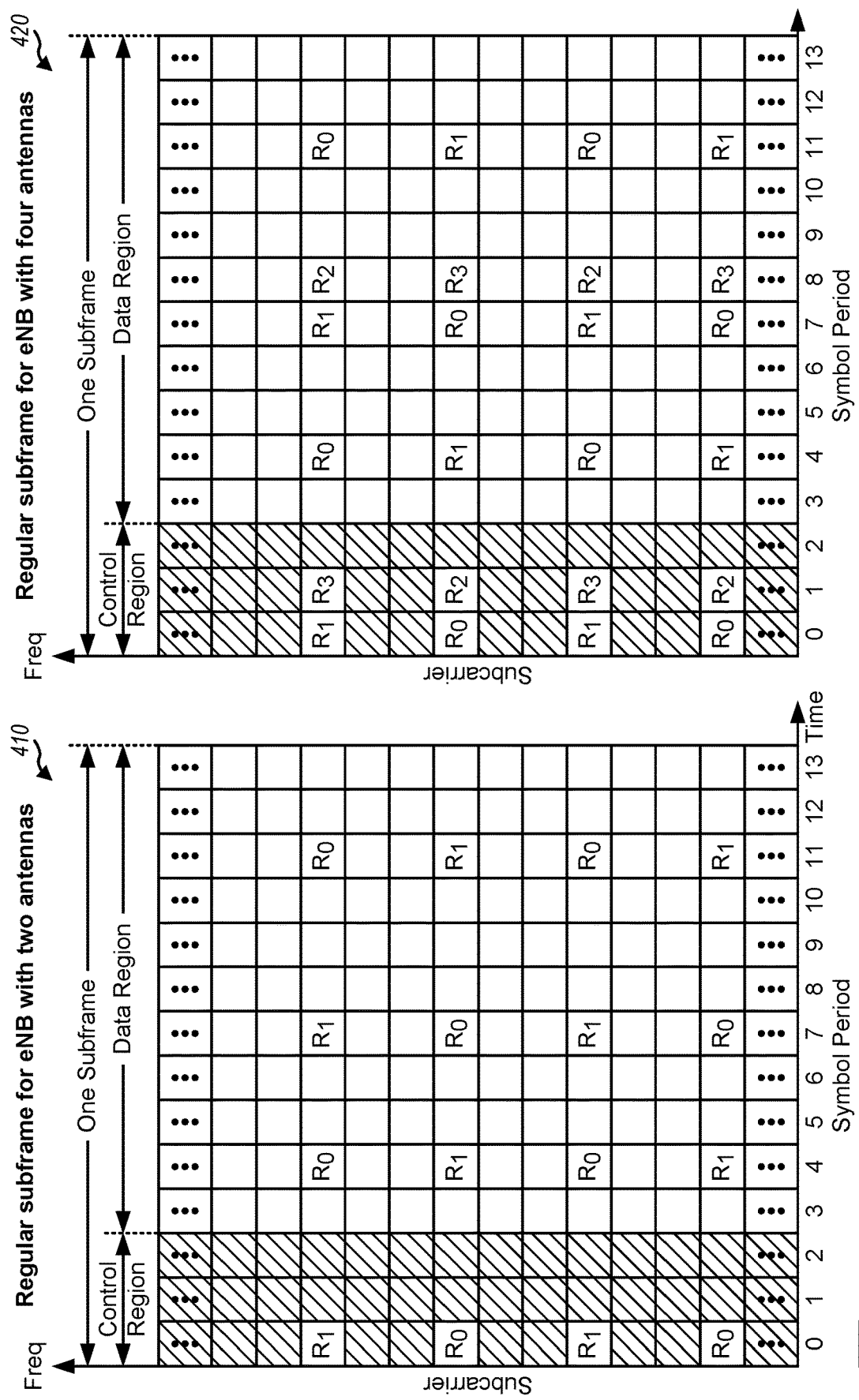
FIG. 4 is a block diagram conceptually illustrating two exemplary subframe formats with the normal cyclic prefix

FIG. 4 shows two exemplary subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc, where q∈{0, . . . , Q−1}.

The wireless network may support hybrid automatic retransmission request (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Example Control Channel Design for Machine Type Communications

As noted above, aspects of the present disclosure provide techniques for signalling control channels to machine type communication (MTC) devices using a relatively narrowband of overall system bandwidth (e.g., using a narrowband within a system bandwidth comprising a plurality of narrowbands).

The focus of traditional LTE design (e.g., for legacy "non MTC" devices) is on the improvement of spectral efficiency, ubiquitous coverage, and enhanced quality of service (QoS) support. Current LTE system downlink (DL) and uplink (UL) link budgets are designed for coverage of high end devices, such as state-of-the-art smartphones and tablets, which may support a relatively large DL and UL link budget.

However, low cost, low rate devices need to be supported as well. For example, certain standards (e.g., LTE Release 12) have introduced a new type of UE (referred to as a category 0 UE) generally targeting low cost designs or machine type communications. For machine type communications (MTC), various requirements may be relaxed as only a limited amount of information may need to be exchanged. For example, maximum bandwidth may be reduced (relative to legacy UEs), a single receive radio frequency (RF) chain may be used, peak rate may be reduced (e.g., a maximum of 100 bits for a transport block size), transmit power may be reduced, Rank 1 transmission may be used, and half duplex operation may be performed.

In some cases, if half-duplex operation is performed, MTC UEs may have a relaxed switching time to transition from transmitting to receiving (or receiving to transmitting). For example, the switching time may be relaxed from 20 µs for regular UEs to 1 ms for MTC UEs. Release 12 MTC UEs may still monitor downlink (DL) control channels in the same way as regular UEs, for example, monitoring for wideband control channels in the first few symbols (e.g., PDCCH) as well as narrowband control channels occupying a relatively narrowband, but spanning a length of a subframe (e.g., ePDCCH).

Certain standards (e.g., LTE Release 13) may introduce support for various additional MTC enhancements, referred to herein as enhanced MTC (or eMTC). For example, eMTC may provide MTC UEs with coverage enhancements up to 15 dB, which may be achieved, for example, by transmission time interval (TTI) bundling of various channels (e.g., PDSCH, PUSCH, PRACH, and/or MPDCCH).

Figure 5:
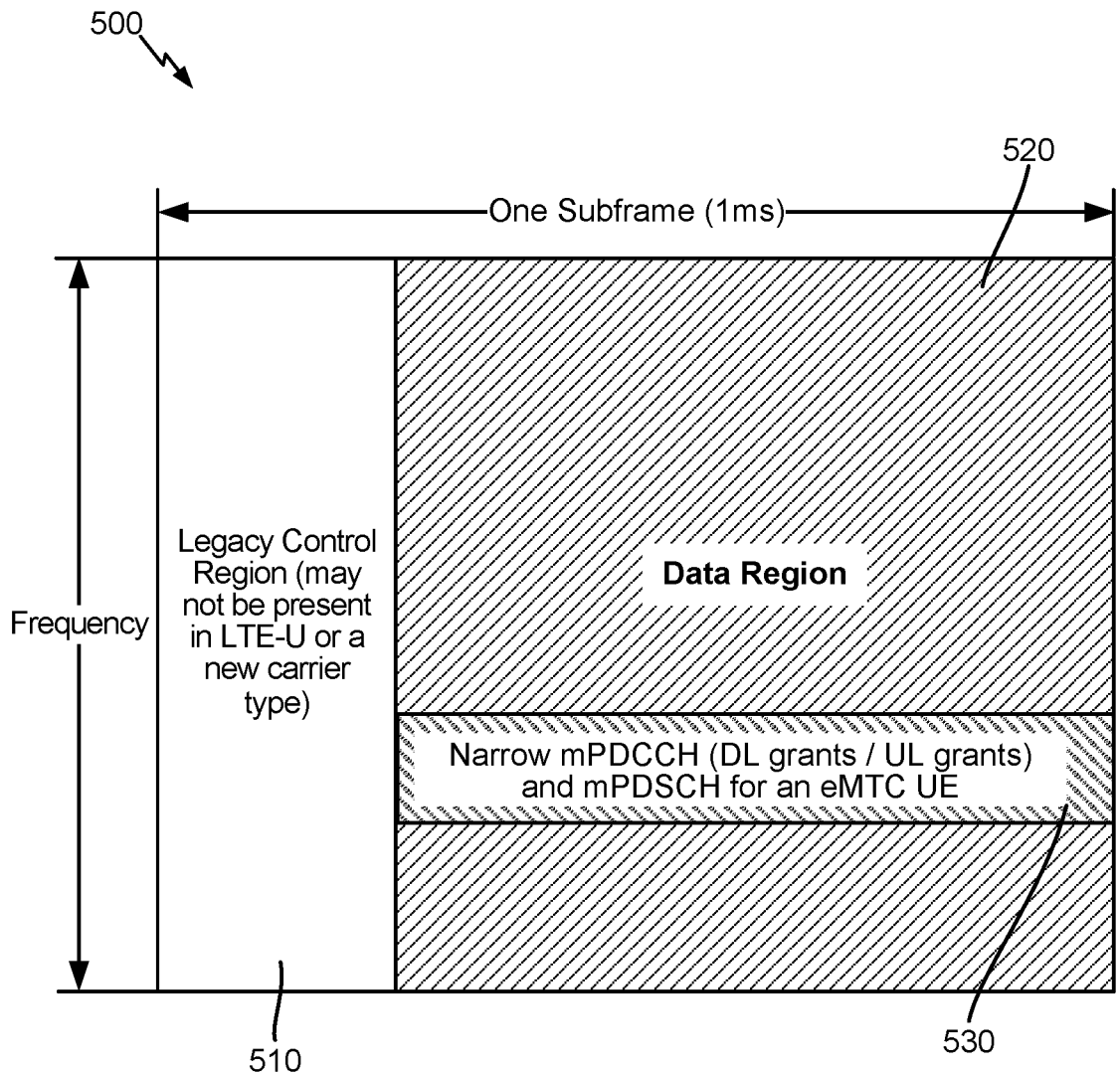
FIG. 5 illustrates an exemplary subframe configuration for eMTC, in accordance with certain aspects of the present disclosure.

As illustrated in the subframe structure 500 of FIG. 5, eMTC UEs can support narrowband operation while operating in a wider system bandwidth (e.g., 1.4/3/5/10/15/20 MHz). In the example illustrated in FIG. 5, a legacy control region 510 may span system bandwidth of a first few symbols, while a narrowband region 530 of the system bandwidth (spanning a narrow portion of a data region 520) may be reserved for an MTC physical downlink control channel (referred to herein as an mPDCCH) and for an MTC physical downlink shared channel (referred to herein as an mPDSCH). In some cases, an MTC UE monitoring the narrowband region may operate at 1.4 MHz or 6 resource blocks (RBs) and may use demodulation reference signals (DM-RS) for demodulation.

However, as noted above, eMTC UEs may be able to operate in a cell with a bandwidth larger than 6 RBs. Within this larger bandwidth, each eMTC UE may still operate (e.g., monitor/receive/transmit) while abiding by a 6-physical resource block (PRB) constraint. In some cases, different eMTC UEs may be served by different narrowband regions (e.g., with each spanning 6-PRB blocks).

In Release 11, an enhanced physical downlink control channel (ePDDCH) was introduced. In contrast to the PDCCH which spans a first few symbols in a subframe, the ePDCCH is frequency division multiplexing (FDM) based and spans (symbols of) the entire subframe. Additionally, as compared to the conventional PDCCH CRS support, the ePDCCH may only support DM-RS.

In some cases, the ePDCCH may be UE-specifically configured. For example, each UE in a network may be configured to monitor a different set of resources for monitoring the ePDCCH. Additionally, the ePDCCH supports two modes of operation: localized ePDCCH, in which a single precoder is applied to each PRB, and distributed ePDCCH, in which two precoders cycle through the allocated resources within each PRB pair.

The ePDCCH may be constructed based on enhanced resource element groups (eREG) and enhanced control channel elements (eCCE). Generally, an eREG is defined by excluding DM-RS REs, assuming a maximum amount of DM-RS (e.g., 24 DM-RS Res for normal cyclic prefix and 16 DM-RS REs for extended cyclic prefix) and including any non-DM-RS REs (REs that do not carry DM-RS). Thus, for normal cyclic prefix, the number of eREGs available for the ePDCCH is 144 (12 subcarriers×14 symbols−24 DM-RS=144 REs), and, for extended cyclic prefix, the number of REs available for the ePDCCH is 128 (12 subcarriers*12 symbols−16 DM-RS=128 REs).

In some cases, a PRB pair is divided into 16 eREGs, regardless of subframe type, cyclic prefix type, PRB pair index, subframe index, etc. Thus, for normal cyclic prefix, there are 9 REs per eREG and 8 REs per eREG for extended cyclic prefix. In some cases the eREG to RE mapping may follow a cyclic/sequential and frequency-first-time-second manner, which may be beneficial to equalizing the number of available REs per eREG. Additionally, due to the presence of other signals, the number of available REs for the ePDCCH may not be fixed and can be different for different eREGs in a PRB pair.

Figure 6A:
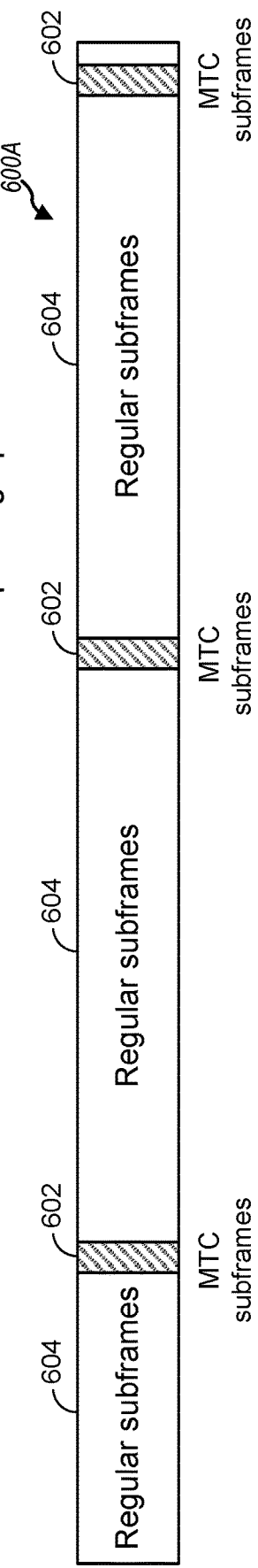
FIGS. 6A and 6B illustrate an example of MTC co-existence within a wideband system, such as LTE, in accordance with certain aspects of the present disclosure.
Figure 6B:
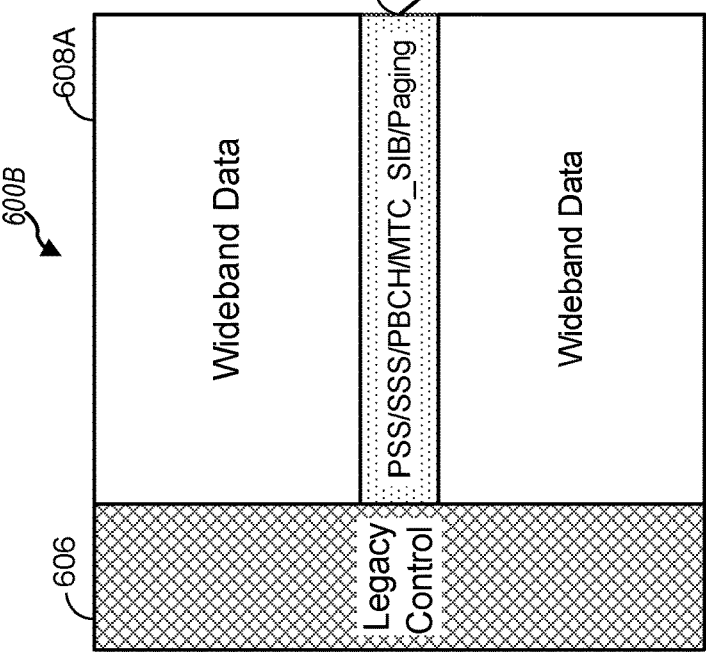

As mentioned above, MTC and/or eMTC operation may be supported in the wireless communication network (e.g., in coexistence with LTE or some other RAT). FIGS. 6A and 6B, for example, illustrate an example of how MTC UEs in MTC operation may co-exist within a wideband system, such as LTE.

As illustrated in the example frame structure of FIG. 6A, subframes associated with MTC and/or eMTC operation may be time division multiplexed (TDM) with regular subframes associated with LTE (or some other RAT).

Additionally or alternatively, as illustrated in the example frame structure of FIG. 6B, one or more narrowbands used by MTC UEs in MTC may be frequency division multiplexed (FDM) within the wider bandwidth supported by LTE. Multiple narrowband regions, with each narrowband region spanning a bandwidth that is no greater than a total of 6 RBs, may be supported for MTC and/or eMTC operation. In some cases, each MTC UE in MTC operation may operate within one narrowband region (e.g., at 1.4 MHz or 6 RBs) at a time. However, MTC UEs in MTC operation, at any given time, may re-tune to other narrowband regions in the wider system bandwidth. In some examples, multiple MTC UEs may be served by the same narrowband region. In other examples, multiple MTC UEs may be served by different narrowband regions (e.g., with each narrowband region spanning 6 RBs). In yet other examples, different combinations of MTC UEs may be served by one or more same narrowband regions and/or one or more different narrowband regions.

As shown in FIG. 6B, in a subframe 600B, the low cost UE can monitor a wideband region 606 for legacy control information and wideband regions 608A and 608B for data. The low cost UEs may operate (e.g., monitor/receive/transmit) within the narrowband regions for various different operations. For example, as shown in FIG. 6B, a first narrowband region 610 (e.g., spanning no more than 6 RBs) of a subframe may be monitored by one or more low cost UEs for either a primary synchronization signal (PSS), a secondary synchronization signal (SSS), a physical broadcast channel (PBCH), MTC signaling, or paging transmission (e.g., paging messages) from a BS in the wireless communication network. As also shown in FIG. 6B, the low cost UE can retune to a second narrowband region 612 (e.g., also spanning no more than 6 RBs) of a subframe to transmit a RACH or data previously configured in signaling received from a BS. In some cases, the second narrowband region 612 may be utilized by the same low cost UEs that utilized the first narrowband region 610 (e.g., the low cost UEs may have re-tuned to the second narrowband region to transmit after monitoring in the first narrowband region). In some cases (although not shown), the second narrowband region 612 may be utilized by different low cost UEs than the low cost UEs that utilized the first narrowband region 610.

Although the examples described herein assume a narrowband of 6 RBS, those skilled in the art will recognize that the techniques presented herein may also be applied to different sizes of narrowband regions.

Example Control Channel Based Broadcast Messaging

For broadcast channel design, in RAN2, control channels may not be needed to indicate system information block (SIB) configurations for MTC and may instead be provided in a master information block (MIB).

For other broadcast channels, such as RACH response (RAR) and paging, it has been proposed to have control-less operation, e.g., transmission of these broadcast channels without corresponding control channel information and instead having UEs rely on blind detection of PDSCH.

However, if broadcast information is transmitted on PDSCH without any control channel information, the UE may be required to perform blind detection of a data channel (e.g., PDSCH), performing multiple Turbo decodings, which may lead to large power consumption and complexity from UE side. Thus, aspects of the present disclosure provide techniques for alleviating a UE's need to perform blind decoding of a PDSCH, for example, by using an MPDCCH channel to directly send broadcast control messages. In some cases, this may result in not needing to use the PDSCH for MTC.

Figure 7:
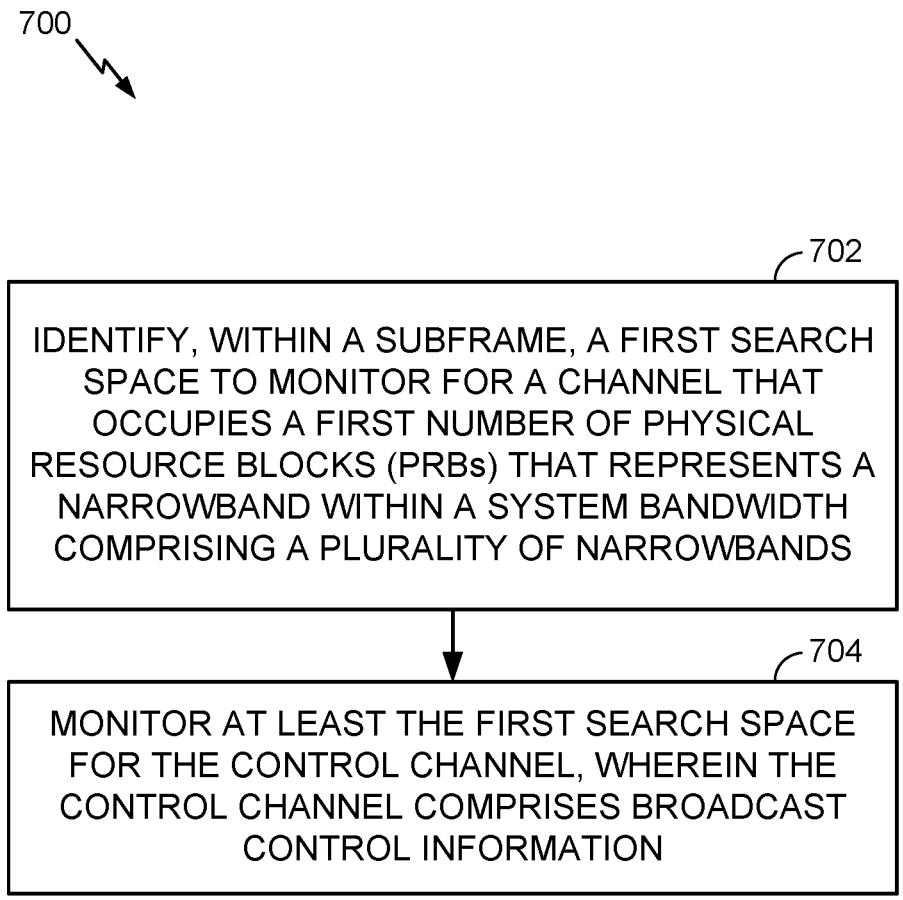
FIG. 7 illustrates example operations for wireless communications, by a user equipment (UE), in accordance with certain aspects of the present disclosure.

FIG. 7 illustrates example operations 700 for wireless communication, in accordance with certain aspects of the present disclosure. Operations 700 may be performed, for example, by a user equipment (UE), such as an MTC or eMTC UE (e.g., UE 120).

Operations 700 begin at 702, by identifying, within a subframe, a first search space to monitor for a control channel that occupies a first number of physical resource blocks (PRBs) that represents a narrowband within a system bandwidth comprising a plurality of narrowbands. At 704, the UE monitors at least the first search space for the control channel, wherein the control channel comprises broadcast control information.

Figure 8:
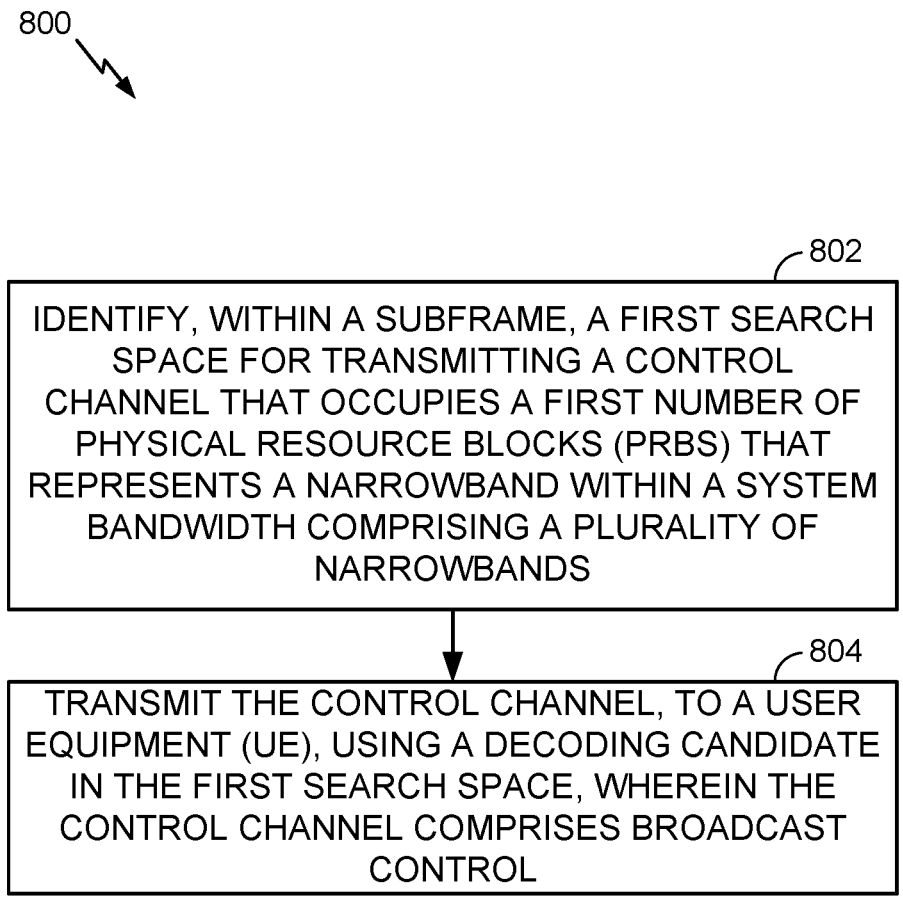
FIG. 8 illustrates example operations for wireless communications, by a base station (BS), in accordance with certain aspects of the present disclosure.

FIG. 8 illustrates example operations 800 for wireless communication, in accordance with certain aspects of the present disclosure. Operations 800 may be performed by a base station (BS).

Operations 800 begin at 802, by identifying, within a subframe, a first search space for transmitting a control channel that occupies a first number of physical resource blocks (PRBs) that represents a narrowband within a system bandwidth comprising a plurality of narrowbands. At 804, the BS transmits the control channel, to a user equipment (UE), using a decoding candidate in the first search space, wherein the control channel comprises broadcast control information.

According to certain aspects, using a control channel (e.g., a machine type communication physical downlink control channel (MPDCCH)) to directly send broadcast control information/messages may provide various benefits. For example, since MPDCCH uses tail biting convolutional codes (TBCCs), it may be simpler for UE to implement blind detection of TBCC, resulting in significantly reduced complexity and power consumption as compared to having a UE blindly decode the PDSCH to look for broadcast control information. Additionally, using an MPDCCH may allow the eNB to multiplex multiple users in the same resource block(s). Another benefit is that MPDCCH is already allowed to occupy up to 6 RBs, which may be the maximum bandwidth that a Rel 13 MTC UE can process, thus allowing this solution to work seamlessly with MTC/eMTC UEs.

In view of the above and according to certain aspects, the MPDCCH may be used to directly send broadcast control information such as random access response (RAR) information (e.g., MPDCCH_RAR information) without the need to of the PDSCH. For example, the BS may identify, within a subframe, a first search space monitored by a UE for a control channel (e.g., an MPDCCH which occupies a number of physical resource blocks (PRBs) that represents a narrowband of wider system bandwidth). The BS may then transmit broadcast control information on the MPDCCH using a decoding candidate in the first search space. Additionally, in some cases, the BS may convey configuration information for the MPDCCH_RAR information in a system information block (SIB) for MTC. Further, according to certain aspects, the UE may identify the first search space and may monitor the first search space for the MPDCCH comprising the broadcast control information.

According to certain aspects, for contention based access, the MPDCCH_RAR information may comprise a timing advance (TA), a grant for Msg 3 for uplink (UL) transmissions, a temporary radio network temporary identifier (T-RNTI), and/or a preamble ID. In some cases, a bundle size for the Msg 3 UL transmissions may be explicitly indicated or matched to a size of Msg 2.

According to certain aspects, for non-contention based access, the MPDCCH_RAR information may comprise cell radio network temporary identifier (C-RNTI), a TA, and/or random access channel (RACH) configuration According to certain aspects, the MPDCCH may also be used to send/receive broadcast control information to support paging for an individual user, for example, in a similar manner as described above with reference to the MPDCCH_RAR information. For example, paging for MPDCCH (e.g., an MPDCCH_Page paging message) may be transmitted by a BS for each UE individually instead of a group of UEs using different narrowbands for each UE. In some cases, however, instead of transmitting paging messages for individual UEs, each MPDCCH_Page paging message may target a very small set of UEs (e.g., no more than two UEs). According to certain aspects, as long as a payload size of the page reasonably small, a single page may be able to accommodate more than one UE. Additionally, in order to optimize paging bundling length, it may be preferable that the group of UEs sharing the same MPDCCH page have similar coverage needs. For example, in order to optimize a paging bundling length of an MPDCCH page, a eNB may determine a small set of UEs with similar coverage needs to share the same MPDCCH page.

According to certain aspects, the payload of an MPDCCH_Page may comprise a User ID for addressing the paging message to a UE and may be scrambled by the eNB with an MTC paging radio network temporary identifier (P-RNTI). In some cases, MTC P-RNTI may be different from a regular UE P-RNTI (i.e., a non-MTC PRNTI), which ensures that the payload is interpreted correctly by MTC UEs, while not confusing regular (non-MTC) users.

According to certain aspects, an eNB may transmit MPDCCH_Page configuration information in SIB for MTC. In some cases, an eNB may partition the MPDCCH_Page into different narrowbands for different users, for example, by defining a rule to map a UE ID to a narrowband region for paging (e.g., narrowband region 610). For example, the eNB may identify different narrowbands for transmitting the MPDCCH_Page paging message to different UEs (i.e., different narrowbands carry paging messages for different UEs) based on a UE-ID-to-narrowband mapping rule.

In some cases, it may be necessary to indicate an MTC SIB modification, for example, to ensure MTC UEs receive/are able to decode the broadcast control information (e.g., the MPDCCH_RAR and MPDCCH_Paging information). For example, since the MTC SIB information may be based on the master information block (MIB), one option of indicating an MTC SIB modification may be to indicate it in the MIB. That is, an eNB may provide an indication of a SIB modification in a MIB transmitted on a physical broadcast channel (PBCH). The UE may receive the indication of the SIB modification and may use information in the modified SIB to decode the broadcast control information. According to certain aspects, to limit amount of MIB acquisitions by the UE, the eNB may specify how often a UE should re-acquire the MIB (e.g., if the system information SI modification period is 10.24 s, UE reacquires the MIB every 10.24 s)

Another option for indicating an MTC SIB modification may be to use the MPDCCH. According to certain aspects, for SIB modification, paging needs to be common for all UEs, which may be accomplished with MPDCCH based paging (e.g., MPDCCH_Page_Common). In some cases, the MPDCCH_page_common may be fixed in a specific narrowband, e.g. in the center 6 RB, or another anchor narrowband where all UE monitors. In addition, SIB modification indication may be different from paging since an indication of a SIB modification may only require 1 bit due to the SIB modification indication being transmitted far less frequently than paging for MTC and not requiring a UE ID to be signaled (unlike paging). According to certain aspects, to minimize blind decodes by the UE, the eNB may indicate/specify a specific format (e.g. a format that is optimized for 1-bit delivery), in which some of the MPDCCH occasions may be reserved for the new format. For example, the MPDCCH may be configured every 10.24 s, but UE checks for new/specific format every 40.96 s.

Another option for indicating for an MTC SIB modification may be to signal a SIB update and paging in the same broadcast MPDCCH occasion, for example, by an eNB using different combinations of two bits. For example, 00 may indicate that there is not a system information (SI) update and that there no UEs are being paged; 01 may indicate no that there is not a SI update, but that there is paging for some UEs; 10 may indicate that there is an SI update, but that there is no paging for any UEs; and 11 may indicate that there is an SI update and that there is paging for some UEs. In this case, a UE may only be required to wake up if paging is indicated (e.g., when two bits in the MPDCCH are set to 01 or 11).

Another option for indicating for an MTC SIB modification may be to separate the MPDCCH into two parts, for example, by reserving some of the resources within a MPDCCH occasion to indicate a SIB update. For example, the first few symbols/slots/subframes of the MPDCCH may be used to indicate whether there is SI update and/or paging as above.

Another option for indicating for an MTC SIB modification may be to use the MPDCCH to directly signal the modification in the SIB. For example, in some cases, if the change in SIB is small, instead of the eNB signaling to the UE to check SIB, the eNB may use the MPDCCH to directly signal the UE as to what fields in SIB have changed and what the new values are. According to certain aspects, providing this kind of signaling may be done up to certain reasonable sizes. For example, three MPDCCH sizes may be defined corresponding to different changes of SIB (e.g., that correspond to changes to specific fields and values in those fields). In some cases the UE may perform blind detection of these three sizes. For example, a smallest MPDCCH size may indicate whether paging changed at all, and the middle size and biggest size may indicate more information regarding changes.

While aspects of the present disclosure are tailored to using a machine type communication physical downlink control channel (MPDCCH) to directly send broadcast control information or indicate a SIB modification, it should be understood that the techniques presented herein may also apply to other technology and other control channels. For example, the techniques presented herein may also apply to narrow band internet of things (NB-IOT) communications using a narrow band physical downlink control channel (NB-PDCCH).

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the corresponding functions. The means may include various hardware and/or software/firmware component(s) and/or module(s), including, but not limited to a circuit, an application specific integrated circuit (ASIC), or processor. Generally, where there are operations illustrated in FIGURES, those operations may be performed by any suitable corresponding counterpart means-plus-function components.

For example, means for identifying and/or means for monitoring may include one or more processors, such as the receive processor 258 and/or the controller/processor 280 of the user terminal 120 illustrated in FIG. 2 and/or the transmit processor 220 and/or the controller/processor 240 of the base station 110 illustrated in FIG. 2. Means for receiving may comprise a receive processor (e.g., the receive processor 258) and/or an antenna(s) 252 of the user terminal 120 illustrated in FIG. 2. Means for transmitting may comprise a transmit processor (e.g., the transmit processor 220) and/or an antenna(s) 234 of the eNB 120 illustrated in FIG. 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or combinations thereof.

Those of skill would further appreciate that the various illustrative logical blocks, modules, circuits, and algorithm steps described in connection with the disclosure herein may be implemented as electronic hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in a combination thereof. A software/firmware module may reside in RAM memory, flash memory, ROM memory, EPROM memory, EEPROM memory, phase change memory (PCM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software/firmware is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communications by a user equipment (UE), comprising:
   identifying, within a subframe, a first search space to monitor for a transmission on a downlink control channel that occupies a first number of physical resource blocks (PRBs) that represents a narrowband within a system bandwidth comprising a plurality of narrowbands;
   monitoring at least the first search space for broadcast control information transmitted on the downlink control channel, wherein the broadcast control information comprises information for a paging message; and
   identifying the narrowband, used for the paging message, according to a mapping, wherein:
   the mapping maps the UE to a narrow band region for paging; and
   the narrowband is different from one or more other narrowbands of the plurality of narrowbands used for paging messages for one or more other UEs.

2. The method of claim 1, wherein the information for the paging message comprises a paging radio network temporary identifier (P-RNTI).

3. The method of claim 1, further comprising receiving configuration information for the paging message in a system information block (SIB).

4. The method of claim 1, further comprising receiving an indication of a system information block (SIB) modification, wherein the SIB comprises information for decoding the broadcast control information.

5. The method of claim 4, wherein receiving the indication of the SIB modification comprises receiving the indication of the SIB modification in a master information block (MIB) transmitted on a physical broadcast channel (PBCH).

6. The method of claim 5, further comprising receiving signaling indicating how often the UE should acquire the MIB.

7. The method of claim 4, wherein receiving the indication of the SIB modification comprises receiving the indication of the SIB modification in the downlink control channel.

8. The method of claim 7, wherein different combinations of two bits in the downlink control channel indicate whether there is a SIB modification and whether there is paging information for the UE.

9. The method of claim 4, wherein the indication of the SIB modification comprises an indication of what fields in the SIB are modified and values of the fields in the SIB that are modified.

10. The method of claim 1, wherein the broadcast control information comprises a random access response (RAR) message.

11. The method of claim 10, wherein for contention based access the RAR message comprises at least one of a timing advance (TA), a grant for uplink (UL) transmissions, a temporary radio network temporary identifier (T-RNTI), or a preamble identifier.

12. The method of claim 11, wherein the RAR message further comprises a bundle size for the UL transmissions.

13. The method of claim 10, wherein for non-contention based access the RAR message comprises at least one of a cell radio network temporary identifier (C-RNTI), a timing advance (TA), or random access channel (RACH) configuration.

14. The method of claim 10, further comprising receiving configuration information for the RAR message in a system information block (SIB).

15. The method of claim 1, wherein the downlink control channel comprises at least one of a machine type communication physical downlink control channel (MPDCCH) or a narrow band physical downlink control channel (NB-PDCCH).

16. A method for wireless communications by a base station (BS), comprising:
- identifying, within a subframe, a first search space for transmitting on a downlink control channel that occupies a first number of physical resource blocks (PRBs) that represents a narrowband within a system bandwidth comprising a plurality of narrowbands;
- transmitting broadcast control information on the downlink control channel, to a user equipment (UE), using a decoding candidate in the first search space, wherein the broadcast control information comprises information for a paging message; and
- identifying the narrowband, used for the paging message, according to a mapping, wherein:
- the mapping maps the UE to a narrow band region for paging; and
- the narrowband is different from one or more other narrowbands of the plurality of narrowbands used for paging messages for one or more other UEs.

17. The method of claim 16, wherein the information for the paging message comprises a paging radio network temporary identifier (P-RNTI).

18. The method of claim 16, further comprising transmitting configuration information for the paging message in a system information block (SIB).

19. The method of claim 16, further comprising transmitting an indication of a system information block (SIB) modification, wherein the SIB comprises information for decoding the broadcast control information.

20. The method of claim 19, wherein transmitting the indication of the SIB modification comprises transmitting the indication of the SIB modification in a master information block (MIB) on a physical broadcast channel (PBCH).

21. The method of claim 20, further comprising transmitting signaling indicating how often the UE should acquire the MIB.

22. The method of claim 19, wherein transmitting the indication of the SIB modification comprises transmitting the indication of the SIB modification in the downlink control channel.

23. The method of claim 22, wherein different combinations of two bits in the downlink control channel indicate whether there is a SIB modification and whether there is paging information for the UE.

24. The method of claim 19, wherein the indication of the SIB modification comprises an indication of what fields in the SIB are modified and values of the fields in SIB that are modified.

25. The method of claim 16, wherein the broadcast control information comprises a random access response (RAR) message.

26. The method of claim 25, wherein for contention based access the RAR message comprises at least one of a timing advance (TA), a grant for uplink (UL) transmissions, a temporary radio network temporary identifier (T-RNTI), or a preamble identifier.

27. The method of claim 26, wherein the RAR message further comprises a bundle size for the UL transmissions.

28. The method of claim 25, wherein for non-contention based access the RAR message comprises at least one of a cell radio network temporary identifier (C-RNTI), a timing advance (TA), or random access channel (RACH) configuration.

29. The method of claim 25, further comprising transmitting configuration information for the RAR message in a system information block (SIB).

30. The method of claim 16, wherein the downlink control channel comprises at least one of a machine type communication physical downlink control channel (MPDCCH) or a narrow band physical downlink control channel (NB-PDCCH).

31. An apparatus for wireless communications by a user equipment (UE), comprising:
- at least one processor; and
- a memory coupled with the at least one processor, comprising instructions executable by the at least one processor to cause the apparatus to:
- identify, within a subframe, a first search space to monitor for a transmission on a downlink control channel that occupies a first number of physical resource blocks (PRBs) that represents a narrowband within a system bandwidth comprising a plurality of narrowbands;
- monitor at least the first search space for broadcast control information transmitted on the downlink control channel, wherein the broadcast control information comprises information for a paging message; and
- identify the narrowband, used for the paging message, according to a mapping, wherein:
- the mapping maps the UE to a narrow band region for paging; and
- the narrowband is different from one or more other narrowbands of the plurality of narrowbands used for paging messages for one or more other UEs.

32. The apparatus of claim 31, wherein the information for the paging message comprises a paging radio network temporary identifier (P-RNTI).

33. The apparatus of claim 31, wherein the memory further comprises instructions executable by the at least one processor to cause the apparatus to receive an indication of a system information block (SIB) modification, wherein the SIB comprises information for decoding the broadcast control information.

34. The apparatus of claim 33, wherein the memory further comprises instructions executable by the at least one processor to cause the apparatus to receive the indication of the SIB modification in a master information block (MIB) transmitted on a physical broadcast channel (PBCH).

35. The apparatus of claim 33, wherein the indication of the SIB modification comprises an indication of what fields in the SIB are modified and values of the fields in the SIB that are modified.

36. The apparatus of claim 31, wherein the broadcast control information comprises a random access response (RAR) message.

37. The apparatus of claim 36, wherein for contention based access the RAR message comprises at least one of a timing advance (TA), a grant for uplink (UL) transmissions, a temporary radio network temporary identifier (T-RNTI), or a preamble identifier.

38. The apparatus of claim 36, wherein for non-contention based access the RAR message comprises at least one of a cell radio network temporary identifier (C-RNTI), a timing advance (TA), or random access channel (RACH) configuration.

39. An apparatus for wireless communications by a base station (BS), comprising:
- at least one processor; and
- a memory coupled with the at least one processor, comprising instructions executable by the at least one processor to cause the apparatus to:
- identify, within a subframe, a first search space for transmitting on a downlink control channel that occupies a first number of physical resource blocks (PRBs) that represents a narrowband within a system bandwidth comprising a plurality of narrowbands; and a transmitter configured to transmit broadcast control information on the downlink control channel, to a user equipment (UE), using a decoding candidate in the first search space, wherein the broadcast control information comprises information for a paging message; and the memory further comprising instructions executable by the at least one processor to cause the apparatus to identify the narrowband, used for the paging message, according to a mapping, wherein:

the mapping maps the UE to a narrow band region for paging; and the narrowband is different from one or more other narrowbands of the plurality of narrowbands used for paging messages for one or more other UEs.

40. The apparatus of claim 39, wherein the information for the paging message comprises paging radio network temporary identifier (P-RNTI).

41. The apparatus of claim 39, wherein the transmitter is further configured to transmit an indication of a system information block (SIB) modification, wherein the SIB comprises information for decoding the broadcast control information.

42. The apparatus of claim 41, wherein the indication of the SIB modification comprises an indication of what fields in the SIB are modified and values of the fields in SIB that are modified.

43. The apparatus of claim 39, wherein the broadcast control information comprises a random access response (RAR) message.

44. The apparatus of claim 43, wherein for contention based access the RAR message comprises at least one of a timing advance (TA), a grant for uplink (UL) transmissions, a temporary radio network temporary identifier (T-RNTI), or a preamble identifier.

45. The apparatus of claim 43, wherein for non-contention based access the RAR message comprises at least one of a cell radio network temporary identifier (C-RNTI), a timing advance (TA), or random access channel (RACH) configuration.

46. An apparatus for wireless communications by a user equipment (UE), comprising:

means for identifying, within a subframe, a first search space to monitor for a transmission on a downlink control channel that occupies a first number of physical resource blocks (PRBs) that represents a narrowband within a system bandwidth comprising a plurality of narrowbands;

means for monitoring at least the first search space for broadcast control information transmitted on the downlink control channel, wherein the broadcast control information comprises information for a paging message; and means for identifying the narrowband, used for the paging message, according to a mapping, wherein:

the mapping maps the UE to a narrow band region for paging; and the narrowband is different from one or more other narrowbands of the plurality of narrowbands used for paging messages for one or more other UEs.

47. An apparatus for wireless communications by a base station (BS), comprising:

means for identifying, within a subframe, a first search space monitored by a user equipment (UE) for transmitting on a downlink control channel that occupies a first number of physical resource blocks (PRBs) that represents a narrowband within a system bandwidth comprising a plurality of narrowbands;

means for transmitting broadcast control information on the downlink control channel, to a user equipment (UE), using a decoding candidate in the first search space, wherein the broadcast control information comprises information for a paging message; and means for identifying the narrowband, used for the paging message, according to a mapping, wherein:

the mapping maps the UE to a narrow band region for paging; and the narrowband is different from one or more other narrowbands of the plurality of narrowbands used for paging messages for one or more other UEs.

48. A non-transitory computer-readable medium, comprising code which is executable by at least one processor, the code comprising:

code to identify, within a subframe, a first search space to monitor for a transmission on a downlink control channel that occupies a first number of physical resource blocks (PRBs) that represents a narrowband within a system bandwidth comprising a plurality of narrowbands;

code to monitor at least the first search space for broadcast control information transmitted on the downlink control channel, wherein the broadcast control information comprises information for a paging message; and code to identify the narrowband, used for the paging message, according to a mapping, wherein:

the mapping maps the UE to a narrow band region for paging; and the narrowband is different from one or more other narrowbands of the plurality of narrowbands used for paging messages for one or more other UEs.

49. A non-transitory computer-readable medium, comprising code which is executable by at least one processor, the code comprising:

code to identify, within a subframe, a first search space for transmitting on a downlink control channel that occupies a first number of physical resource blocks (PRBs) that represents a narrowband within a system bandwidth comprising a plurality of narrowbands;

code to transmit broadcast control information on the downlink control channel, to a user equipment (UE), using a decoding candidate in the first search space, wherein the broadcast control information comprises information for a paging message; and code to identify the narrowband, used for the paging message, according to a mapping, wherein identifying the first search space is based at least in part on the identified narrowband, wherein:

the mapping maps the UE to a narrow band region for paging; and the narrowband is different from one or more other narrowbands of the plurality of narrowbands used for paging messages for one or more other UEs.

* * * * *